United States Patent Office 3,223,544
Patented Dec. 14, 1965

3,223,544
MANUFACTURE OF CATIONIC PAPER SIZING KETENE DIMER EMULSIONS
Anthony Ralph Savina, Stamford, Conn., assignor to American Cyanamid Company, Stamford, Conn., a corporation of Maine
No Drawing. Filed Mar. 19, 1963, Ser. No. 266,179
4 Claims. (Cl. 106—213)

The present invention relates to the preparation of improved dispersions of hydrophobic cellulose-reactive paper-sizing alkyl ketene dimers. More particularly, the invention relates to a method of preparing such dispersions by use of cationic starch as principal dispersing agent.

The hydrophobic cellulose-reacting paper-sizing fatty ketene dimers, when dispersed in water, form valuable sizing compositions useful in the manufacture of paper. Particularly useful compositions are obtained when the dispersions are prepared by use of cationic starch, as cationic starch both renders the dispersed ketene dimer sizes cellulose-substantive and at least partially counteracts the decrease in dry tensile strength which these sizes impart.

Experience has shown, however, that cationic starch when used as principal dispersing agent for ketene dimer sizes causes the formation of many small flecks or grains, which are very noticeable when the dispersion is spread on glass as a thin film.

The ketene dimer size dispersions are generally prepared by emulsifying the ketene dimers in water having a temperature above their melting point, and evidently the grains or flecks result from aggregation or coalescence of the droplets before the emulsion can be stabilized by rapid chilling to a temperature at which the droplets become solid.

These grains or flecks (hereinafter termed "aggregates") are detrimental in that they tend to float and hence cause the dispersion to separate into two dissimilar layers.

The discovery has now been made that the development of ketene dimer aggregates in the process described above is suppressed and, if desired, prevented entirely by the presence of an anionic agent selected from the group consisting of sodium lignosulfonate, the formaldehyde condensation product of sodium naphthalenesulfonate, and mixtures thereof during the emulsification.

The result is surprising, because the presence of an anionic agent during a cationic emulsification is generally considered to favor the formation of aggregates.

It is critical in the process of the present invention that the anionic dispersing agent, or mixture of agents, be present during the emulsification step, as aggregation occurs rapidly in the absence of the anionic material once the emulsification step is performed.

The invention appears to be specific to the agents named. Several other anionic agents including sodium dioctyl sulfosuccinate and sodium lauryl sulfate have been tried for the purpose and have been found to be substantially without the desired effect.

More in detail, according to a preferred embodiment, an aqueous emulsification medium is first prepared. This contains at least sufficient of cationic starch to render the dispersed ketene dimer particles cellulose-substantive and an effective amount of one or more of the named anionic materials as agents preventing the formation of aggregates.

The amount of cationic starch present is that needed to render the dispersed ketene dimer particles cellulose-substantive. This amount can be found by actual laboratory trial or by use of an electrophoresis cell. This amount is sufficient to cause satisfactory emulsification of the ketene dimer. The cationic starch, however, is an effective dry strength agent for paper, and it is within the scope of the invention to employ a sufficient amount for this purpose, over and above that needed for emulsification.

The cationic starch referred to is water-soluble starch carrying sufficient cationic amino, quaternary ammonium, or other cationic groups to render the starch as a whole cellulose-substantive.

The amount of anionic agent needed to prevent formation of aggregates varies with the particular ketene dimer or mixture of ketene dimers used and the pH and temperature of the aqueous emulsification medium, and is therefore most conveniently found by trial. Amounts within the range of 1% to 10% of the weight of the starch have proved satisfactory, and larger and smaller amounts may give valuable results.

The temperature of the aqueous medium is at or above the melting point of the ketene dimer, and its pH is adjusted to about 6–7.

The ketene dimer, either in molten or in particulate solid form, is then added to the aqueous medium with vigorous agitation. An emulsion forms which may be employed directly as a beater additive. It is generally preferable to homogenize this emulsion as a finer grained product results which experience shows is generally effective.

If the emulsion is not to be used at once, it is generally best to rapidly cool it to room temperature so as to minimize the hydrolysis of the ketene dimer which would otherwise occur. The pH of the resulting dispersion is adjusted to 3 to 5.

The invention does not depend upon the solids content of the emulsion or the final dispersion.

It is within the scope of the invention to employ one or more non-ionic dispersing agents in conjunction with the cationic starch, and to add before, during, or after the emulsification materials which are commonly present in paper sizing compositions for example titanium dioxide pigment, ultramarine pigment, blanc fixe, and perfume.

The following examples are preferred embodiments of the invention and are not to be construed as limitations thereon.

*Example 1*

The following illustrates the preparation of aqueous paper-sizing fatty ketene dimer dispersions which are substantially free from grainy aggregates resulting from the presence of a cationic starch and an anionic dispersing agent during the emulsification step.

Into 900 cc. of intensively agitated water at 70° C. containing 30 g. of a water-soluble cationic starch and 1.5 g. of an anionic dispersing agent as shown in the table below is slowly added 60 g. of hexadecyl ketene dimer. The resulting emulsion is made up to 1 liter by addition of water, homogenized, and immediately rapidly cooled to room temperature.

To illustrate the necessity for the combination of dispersing agents the procedure is repeated with the anionic agent omitted as control.

The resulting dispersions are examined for aggregates by diluting 17 cc. of each dispersion to 100 cc. with water at room temperature to form dispersions containing 1% by weight of hexadecyl ketene dimer, spreading a few drops on a glass plate, and examining the resulting thin liquid films by the unaided eye. Aggregates, when present, appear as very small but easily recognizable white grains.

Results are as follows:

| Run No. | Ketene Dimer | Dispersing Agents | | Aggregates |
|---|---|---|---|---|
| | | Cationic | Anionic | |
| 1 | Hexadecyl | Cat. starch | None | Many. |
| 2 | ---do--- | ---do--- | Na lignosulfonate | None. |
| 3 | ---do--- | ---do--- | Na naphthalenesulfonate, CH₂O cond. product. | Do. |

*Example 2*

The procedure of Runs 2 and 3 of Example 1 is repeated, except that octadecyl ketene dimer is employed in place of the hexadecyl ketene dimer of Example 1. Results are substantially the same.

I claim:
1. In the manufacture of a substantially uniformly fine dispersion of a hydrophobic cellulose-reactive paper-sizing fatty ketene dimer wherein said dimer is emulsified in an aqueous liquid which has a temperature above the melting point of said ketene dimer and which contains at least sufficient of a water-soluble cationic starch to render the ketene dimer cellulose-substantive, the improvement which consists in adding to said aqueous liqiud, prior to said emulsification and in an amount sufficient to inhibit the formation of ketene dimer aggregates, an anionic material selected from the group consisting of sodium lignosulfonate, the formaldehyde condensation product of sodium naphthalenesulfonate, and mixtures thereof.

2. A process according to claim 1 wherein the pH of the aqueous medium during emulsification is between 3 and 5.

3. In the manufacture of a substantially uniformly fine dispersion of a hydrophobic cellulose-reactive paper-sizing fatty ketene dimer wherein said dimer is emulsified in an aqueous liquid which has a temperature above the melting point of said ketene dimer and which contains at least sufficient of a water-soluble cationic starch to render the ketene dimer cellulose-substantive, the improvement which consists in adding to said aqueous liquid prior to said emulsification a quantity of sodium lignosulfonate sufficient to inhibit the formation therein of ketene dimer aggregates.

4. In the manufacture of a substantially uniformly fine dispersion of a hydrophobic cellulose-reactive paper-sizing fatty ketene dimer wherein said dimer is emulsified in an aqueous liquid which has a temperature above the melting point of said ketone dimer and which contains at least sufficient of a water-soluble cationic starch to render the ketene dimer cellulose-substantive, the improvement which consists in adding to said aqueous liquid prior to said emulsification a quantity of the formaldehyde condensation product of sodium naphthalenesulfonate sufficient to inhibit the formation therein of ketone dimer aggregates.

References Cited by the Examiner

UNITED STATES PATENTS

| | | | |
|---|---|---|---|
| 2,491,832 | 12/1949 | Salvesen | 260—124.3 |
| 2,988,526 | 6/1961 | Prichard | 106—170 |
| 3,050,437 | 8/1962 | Arlt | 162—158 |
| 3,070,452 | 12/1962 | Harris et al. | 106—213 |
| 3,130,118 | 4/1964 | Chapman | 106—213 |

FOREIGN PATENTS 804,504  11/1958  Great Britain.

ALEXANDER H. BRODMERKEL, *Primary Examiner.*

L. B. HAYES, *Assistant Examiner.*

UNITED STATES PATENT OFFICE
CERTIFICATE OF CORRECTION

Patent No. 3,223,544                                    December 14, 1965

Anthony Ralph Savina

It is hereby certified that error appears in the above numbered patent requiring correction and that the said Letters Patent should read as corrected below.

Column 4, lines 14 and 21, for "ketone", each occurrence, read -- ketene --.

Signed and sealed this 11th day of October 1966.

(SEAL)
Attest:

ERNEST W. SWIDER                              EDWARD J. BRENNER
Attesting Officer                                 Commissioner of Patents